US009441609B2

(12) United States Patent
Fujiwara

(10) Patent No.: US 9,441,609 B2
(45) Date of Patent: Sep. 13, 2016

(54) TORQUE LIMITER, WIND TURBINE AND WIND TURBINE GENERATOR

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 520 days.

(21) Appl. No.: 14/029,146

(22) Filed: Sep. 17, 2013

(65) Prior Publication Data

US 2014/0086744 A1 Mar. 27, 2014

(30) Foreign Application Priority Data

Sep. 24, 2012 (JP) ................................ 2012-209649

(51) Int. Cl.
 *F16D 7/02* (2006.01)
 *F03D 7/02* (2006.01)
 *F16D 7/00* (2006.01)
 (Continued)

(52) U.S. Cl.
 CPC . *F03D 7/02* (2013.01); *F16D 7/00* (2013.01); *F16D 41/066* (2013.01); *F16D 41/105* (2013.01); *F16D 43/20* (2013.01); *F16D 2041/0665* (2013.01); *Y02E 10/722* (2013.01); *Y02E 10/723* (2013.01)

(58) Field of Classification Search
 CPC .......... F03D 7/02; F16D 7/00; F16D 41/105; F16D 41/066; F16D 43/20; F16D 2041/0665
 See application file for complete search history.

(56) References Cited

U.S. PATENT DOCUMENTS

| 4,901,831 A | * | 2/1990 | Ito | B62D 5/043 |
| | | | | 180/444 |
| 7,520,813 B2 | * | 4/2009 | Louis | B64C 27/50 |
| | | | | 464/36 |
| 7,832,542 B2 | * | 11/2010 | Byun | F16D 41/066 |
| | | | | 192/223.2 |

(Continued)

FOREIGN PATENT DOCUMENTS

| FR | 521338 A | 7/1921 |
| GB | 409 251 A | 4/1934 |

(Continued)

OTHER PUBLICATIONS

Apr. 17, 2015 Extended Search Report issued in EP Application No. 13185141.2.

(Continued)

*Primary Examiner* — Richard Edgar
*Assistant Examiner* — Eldon Brockman
(74) *Attorney, Agent, or Firm* — Oliff PLC

(57) ABSTRACT

In a torque limiter, wedge-shaped spaces are formed between inner and outer rings so as to be arranged in the circumferential direction. In each wedge-shaped space, there are arranged a first roller and a second roller that transmit torque between the inner and outer rings by being brought into wedge-engagement when the inner and outer rings rotate relative to each other in one direction and in the other direction, respectively. Between the first and second rollers, there is arranged an urging device that urges the first and second rollers in such directions that the first and second rollers are brought into wedge-engagement. Each wedge-shaped space is formed such that when the torque becomes equal to or higher than a predetermined value, a first wedge angle of the first roller or a second wedge angle of the second roller becomes such an angle that wedge-engagement of the roller is cancelled.

6 Claims, 4 Drawing Sheets

(51) Int. Cl.
*F16D 41/066* (2006.01)
*F16D 41/10* (2006.01)
*F16D 43/20* (2006.01)

(56) References Cited

U.S. PATENT DOCUMENTS

| | | | |
|---|---|---|---|
| 8,113,326 B2* | 2/2012 | Kawai | F16D 41/105 192/15 |
| 8,132,658 B2* | 3/2012 | Kawai | B60N 2/1615 192/15 |
| 8,448,764 B2* | 5/2013 | Akiyoshi | F16D 41/105 192/35 |
| 8,662,271 B2* | 3/2014 | Iwano | F16D 41/105 192/44 |
| 8,886,428 B2* | 11/2014 | Mori | F16D 41/105 476/48 |
| 8,985,296 B2* | 3/2015 | Kawai | B60N 2/1615 192/15 |
| 9,103,384 B2* | 8/2015 | Akiyoshi | F16D 41/105 |
| 2006/0211500 A1* | 9/2006 | Louis | B64C 27/50 464/30 |
| 2008/0179156 A1* | 7/2008 | Byun | F16D 41/066 192/45.1 |
| 2008/0289446 A1* | 11/2008 | Kamei | F02N 15/023 74/7 R |
| 2009/0250854 A1* | 10/2009 | Harada | F16D 41/066 267/154 |
| 2009/0272613 A1* | 11/2009 | Kawai | B60N 2/1615 192/45.01 |
| 2010/0224461 A1* | 9/2010 | Kawai | F16D 41/105 192/41 R |
| 2010/0314212 A1* | 12/2010 | Akiyoshi | F16D 41/105 192/66.1 |
| 2011/0127134 A1* | 6/2011 | Iwano | F16D 41/105 192/45.008 |
| 2011/0269554 A1 | 11/2011 | Minegishi et al. | |
| 2012/0279819 A1* | 11/2012 | Kawai | B60N 2/1615 192/55.2 |
| 2013/0299298 A1* | 11/2013 | Akiyoshi | F16D 41/105 192/71 |
| 2014/0039771 A1* | 2/2014 | Mori | F16D 41/105 701/67 |

FOREIGN PATENT DOCUMENTS

| | | |
|---|---|---|
| JP | H01-158827 U | 11/1989 |
| JP | A-2-271115 | 11/1990 |
| JP | A-2005-147316 | 6/2005 |
| JP | 2005-315332 A | 11/2005 |
| JP | A-2010-1996 | 1/2010 |
| JP | 2012-180809 A | 9/2012 |

OTHER PUBLICATIONS

May 24, 2016 Office Action issued in Japanese Patent Application 2012-209649.

* cited by examiner

TORQUE LIMITER, WIND TURBINE AND WIND TURBINE GENERATOR

INCORPORATION BY REFERENCE

The disclosure of Japanese Patent Application No. 2012-209649 filed on Sep. 24, 2012 including the specification, drawings and abstract, is incorporated herein by reference in its entirety.

BACKGROUND OF THE INVENTION

1. Field of the Invention

The invention relates to a torque limiter, a wind turbine, and a wind turbine generator.

2. Description of the Related Art

A wind turbine generator includes pitch drive devices used to adjust the pitch angle of blades of a wind turbine and yaw drive devices used to turn a blade-supporting nacelle relative to a tower. Each of the pitch drive devices and the yaw drive devices is formed of a combination of a motor capable of rotating in the forward rotation direction and the reverse rotation direction and a speed reducer (see, for example, Japanese Patent Application Publication No. 2010-1996 (JP 2010-1996 A)). Such a wind turbine generator has a problem that, when an abrupt change occurs in the wind speed or in the wind direction, excessively high torque acts on the motors and the speed reducers of the pitch drive devices and the yaw drive devices, which may cause damages to the motors and the speed reducers.

In order to solve this problem, a torque limiter may be arranged between a driving member, such as a motor shaft of a motor, and a driven member to which power is transmitted from the motor, as described in Japanese Patent Application Publication No. 2005-147316 (JP 2005-147316 A). In the torque limiter, a plurality of wedge-shaped spaces is formed between an outer peripheral face of an inner ring and an inner peripheral face of an outer ring so as to be arranged in the circumferential direction, and rollers that are brought into wedge-engagement with the inner ring and the outer ring upon application of external force to the rollers are arranged in the wedge-shaped spaces. Due to this configuration, torque is transmitted between the inner ring and the outer ring while the rollers are in the wedge-engagement state between the inner ring and the outer ring, and when a torque equal to or higher than a predetermined magnitude is applied, the wedge-engagement of each roller is cancelled. If the wedge-engagement is cancelled, the inner ring and the outer ring rotate at idle, and thus transmission of torque between the inner ring and the outer ring is interrupted.

The torque limiter is able to interrupt the transmission of torque when the inner ring and the outer ring are rotating relative to each other in one direction. However, when the inner ring and the outer ring are rotating relative to each other in the other direction (the direction opposite to the one direction), the torque limiter is not able to interrupt the transmission of torque. Therefore, in the case where the motor is rotated in the forward rotation direction and the reverse rotation direction as in each of the aforementioned pitch drive devices and yaw drive devices, the problem that damages are given to the motor still occurs if excessively high torque is applied in the other direction.

SUMMARY OF THE INVENTION

One object of the invention is to provide a torque limiter, a wind turbine and a wind turbine generator that are configured such that transmission of excessively high torque is interrupted regardless of whether the excessively high torque is applied in the forward rotation direction or in the reverse rotation direction.

An aspect of the invention relates to A torque limiter, including: an inner ring; an outer ring; cam faces that are formed on one of an outer peripheral face of the inner ring and an inner peripheral face of the outer ring, and that define, in cooperation with the other one of the outer peripheral face of the inner ring and the inner peripheral face of the outer ring, a plurality of wedge-shaped spaces arranged in a circumferential direction, in each of which a clearance in a radial direction between the inner ring and the outer ring gradually becomes smaller toward each of both sides of the wedge-shaped space in the circumferential direction; first rollers each of which is arranged in a corresponding one of the wedge-shaped spaces and transmits a first torque between the inner ring and the outer ring by being brought into wedge-engagement with the inner ring and the outer ring, at one side in the wedge-shaped space in the circumferential direction when the inner ring and the outer ring rotate relative to each other in one direction; second rollers each of which is arranged in a corresponding one of the wedge-shaped spaces and transmits a second torque between the inner ring and the outer ring by being brought into wedge-engagement with the inner ring and the outer ring, at the other side in the wedge-shaped space in the circumferential direction when the inner ring and the outer ring rotate relative to each other in the other direction that is a direction opposite to the one direction; and urging devices each of which is arranged between a corresponding one of the first rollers and a corresponding one of the second rollers, and urges the first roller and the second roller in such directions that the first roller and the second roller are brought into the wedge-engagement. Each of the wedge-shaped spaces is formed such that when the first torque becomes higher than or equal to a predetermined value, a first wedge angle of the first roller becomes such an angle that the wedge-engagement of the first roller is cancelled, and when the second torque becomes higher than or equal to the predetermined value, a second wedge angle of the second roller becomes such an angle that the wedge-engagement of the second roller is cancelled.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
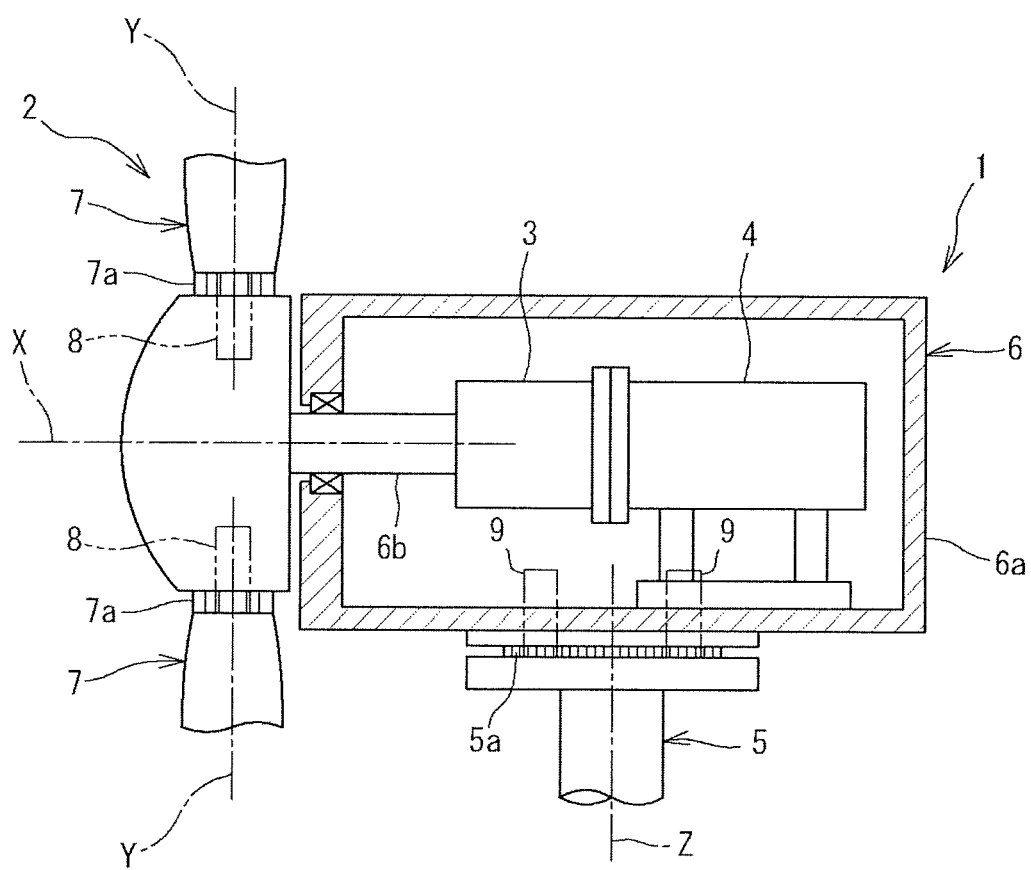
FIG. 1 is a sectional view illustrating a wind turbine generator according to an embodiment of the invention.

Hereinafter, embodiments of the invention will be described in detail with reference to the accompanying drawings. FIG. 1 is a sectional view illustrating a wind turbine generator 1 according to an embodiment of the invention. As illustrated in FIG. 1, the wind turbine generator 1 includes a wind turbine 2, a speed increaser 3 and a generator 4. The wind turbine 2 has a plurality of blades 7 that revolve upon reception of force of wind. The speed increaser 3 increases the speed of rotation produced by the blade 7. The generator 4 is connected to the speed increaser 3. The generator 4 is configured such that when the rotation of which the speed has been increased by the speed increaser 3 is input into the generator 4, a rotor (not shown) is driven and electricity is generated as the rotor is driven.

Figure 2:
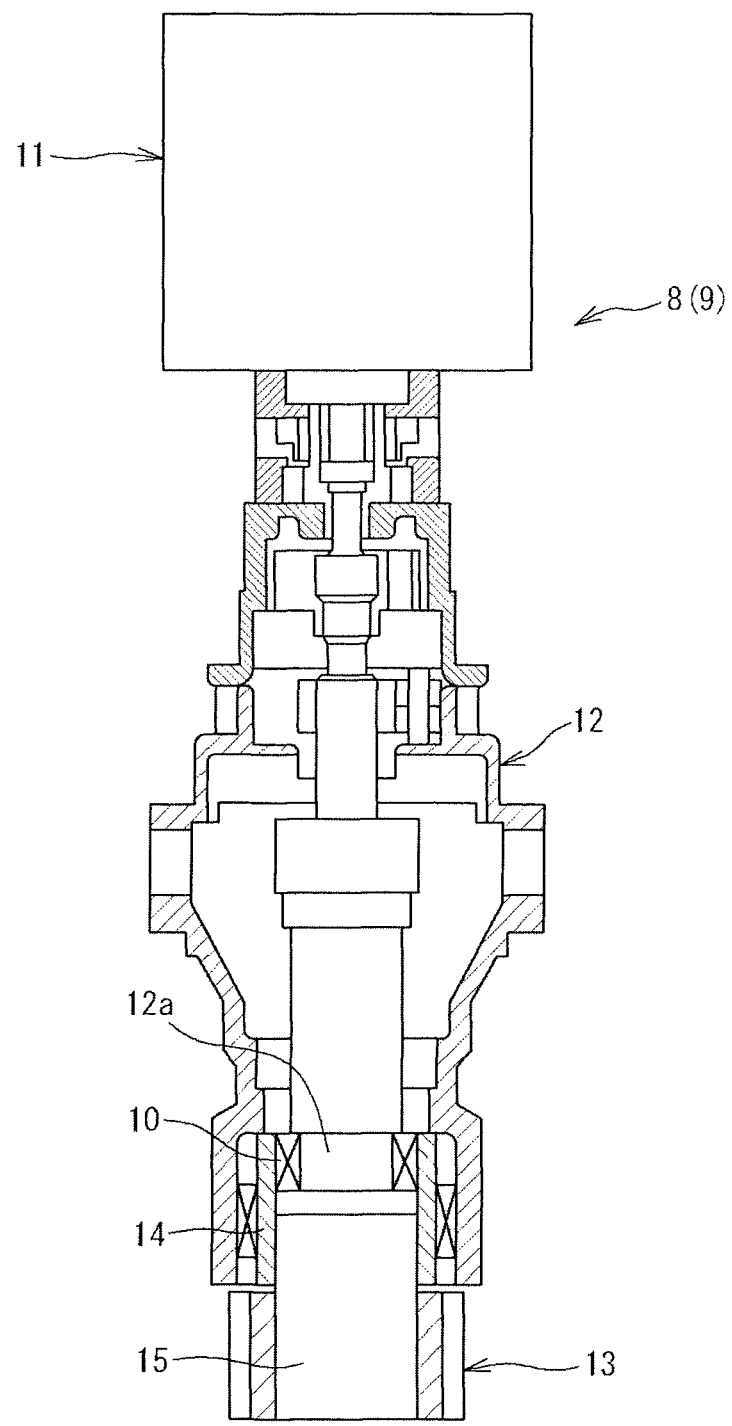
FIG. 2 is a sectional view illustrating a drive device of a wind turbine in the wind turbine generator.

The wind turbine 2 includes a tower 5, a nacelle 6, the blades 7, pitch drive devices 8, yaw drive devices 9 and torque limiters 10 (see FIG. 2). The nacelle 6 is formed of a casing 6a and a main shaft 6b. The main shaft 6b is supported by the casing 6a so as to be rotatable about an axis X that extends in the horizontal direction. The casing 6a is supported by an upper end portion of the tower 5 so as to be turnable about an axis Z that extends in the vertical direction. The speed increaser 3 and the generator 4 are housed inside the casing 6a. One end portion of the main shaft 6b in its axial direction is connected to the speed increaser 3. The other end portion of the main shaft 6b in the axial direction supports a base end portion of each blade 7. The pitch drive devices 8 are used to adjust the pitch angle (blade angle) of each blade 7, and are arranged between the main shaft 6b and the blades 7. The yaw drive devices 9 are used to turn the nacelle 6 relative to the tower 5, and are arranged between the tower 5 and the nacelle 6.

FIG. 2 is a sectional view illustrating the configuration of each of the pitch drive devices 8 and the yaw drive devices 9. As illustrated in FIG. 2, each of the pitch drive devices 8 and the yaw drive devices 9 includes a motor 11, a multi-stage speed reducer 12, and a pinion gear 13. The motor 11 is capable of rotating in the forward rotation direction and the reverse rotation direction. The speed reducer 12 reduces the speed of the rotation output from the motor 11. A rotary body 14 is connected to an output shaft 12a of the speed reducer 12 via the torque limiter 10. The pinion gear 13 is connected to the rotary body 14 via a connecting shaft 15 so as to be rotatable together with the rotary body 14. The pinion gear 13 of each pitch drive device 8 is in mesh with a gear 7a that is formed at a base end portion of a corresponding one of the blades 7, as illustrated in FIG. 1. Therefore, by driving the motor 11 of each pitch drive device 8 to rotate the pinion gear 13, the corresponding blade 7 is pivoted about an axis Y of the blade 7, which extends in the longitudinal direction of the blade 7, via the gear 7a. The pinion gear 13 of each yaw drive device 9 is in mesh with a gear 5a that is formed at an upper end portion of the tower 5, as illustrated in FIG. 1. Therefore, by driving the motor 11 of each yaw drive device 9 to rotate the pinion gear 13, the nacelle 6 is turned about the axis Z of the nacelle 6, via the gear 5a.

Figure 3:
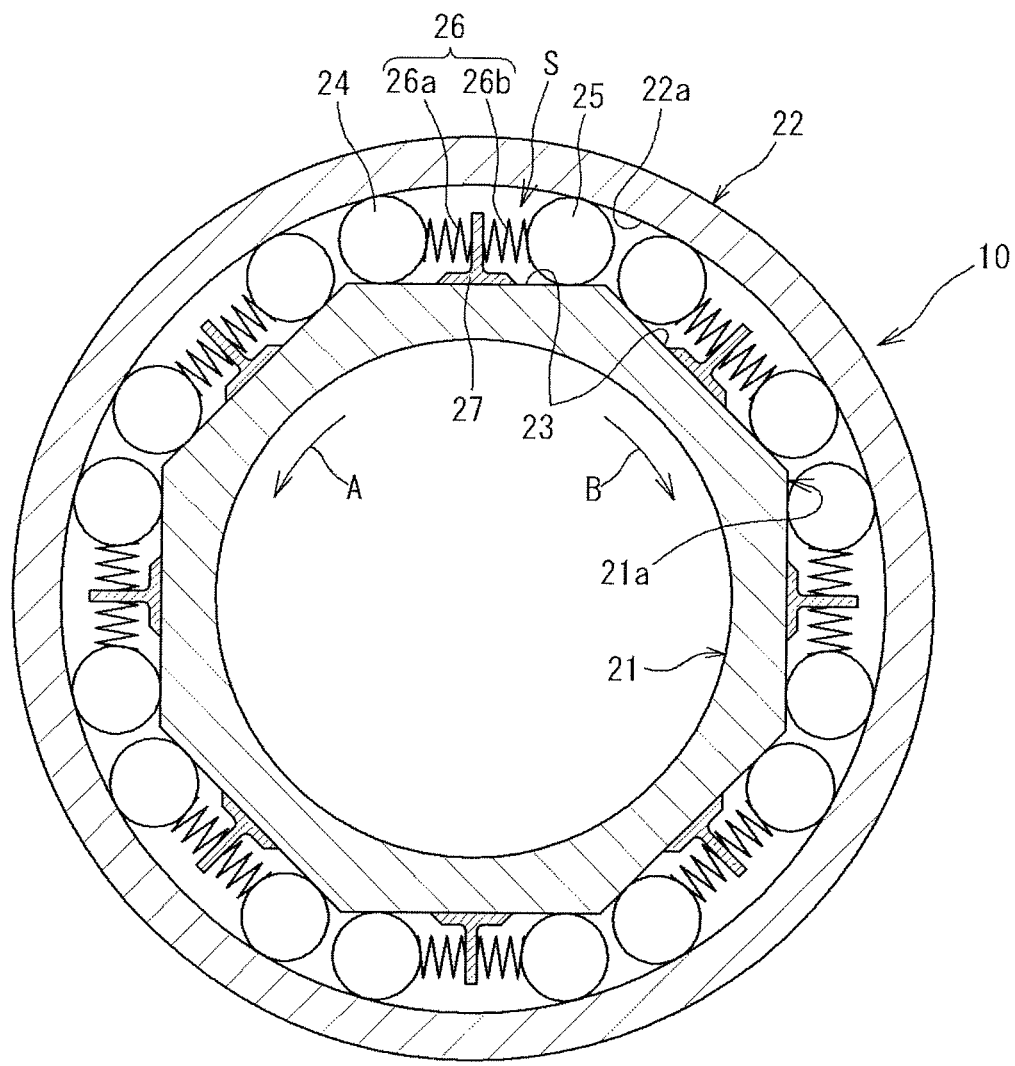
FIG. 3 is a sectional view illustrating a torque limiter of the wind turbine.

FIG. 3 is a sectional view illustrating the torque limiter 10. As illustrated in FIG. 3, the torque limiter 10 includes an inner ring 21, an outer ring 22, cam faces 23, a plurality of (eight) first rollers 24, a plurality of (eight) second rollers 25, and urging devices 26. As illustrated in FIG. 2 and FIG. 3, the inner ring 21 is fixedly fitted onto the output shaft 12a of the speed reducer 12. The inner ring 21 is configured so as to rotate together with the output shaft 12a. The outer ring 22 is arranged so as to be coaxial with the inner ring 21, and is fixed to the inner periphery of the rotary body 14. The outer ring 22 is configured so as to rotate together with the rotary body 14.

The cam faces 23 are formed on an outer peripheral face 21a of the inner ring 21. Between the cam faces 23 and an inner peripheral face 22a of the outer ring 22, a plurality of (eight) wedge-shaped spaces S is formed so as to be arranged in the circumferential direction. Each wedge-shaped space S is formed such that the clearance in the radial direction between the cam face 23 and the inner peripheral face 22a gradually becomes smaller toward each of the two ends of the wedge-shaped space S in the circumferential direction.

The first rollers 24 and the second rollers 25 are columnar rollers that have the same diameter, and are arranged so that one first roller 24 and one second roller 25 are arranged in each wedge-shaped space S. Each first roller 24 is configured such that when the inner ring 21 and the outer ring 22 rotate relative to each other in one direction (the direction indicated by an arrow A in FIG. 3), the first roller 24 moves to one side of the wedge-shaped space S in the circumferential direction (to the side indicated by the arrow A), and are engaged with the cam face 23 and the inner peripheral face 22a of the outer ring 22. Thus, the first rollers 24 are brought into wedge-engagement with the inner ring 21 and the outer ring 22, so that first torque is transmitted between the inner ring 21 and the outer ring 22. Each second roller 25 is configured such that when the inner ring 21 and the outer ring 22 rotate relative to each other in the other direction (the direction indicated by an arrow B in FIG. 3), the second roller 25 moves to the other side of the wedge-shaped space S in the circumferential direction (to the side indicated by the arrow B), and are engaged with the cam face 23 and the inner peripheral face 22a of the outer ring 22. Thus, the second rollers 25 are brought into wedge-engagement with the inner ring 21 and the outer ring 22, so that second torque is transmitted between the inner ring 21 and the outer ring 22.

Each urging device 26 is arranged between the first roller 24 and the second roller 25 in a corresponding one of the wedge-shaped spaces S. In each wedge-shaped space S, the urging device 26 urges the first roller 24 and the second roller 25 in such directions that the first roller 24 and the second roller 25 are brought into wedge-engagement. Each urging device 26 in the present embodiment is formed of a first elastic member 26a and a second elastic member 26b that are, for example, compression coil springs. The first elastic member 26a in each wedge-shaped space S is arranged between the first roller 24 and a spring receiving portion 27 fixed to a center portion of the cam face 23 in the circumferential direction, and urges the first roller 24 to the one side of the wedge-shaped space S in the circumferential direction. Furthermore, the second elastic member 26b in each wedge-shaped space S is arranged between the second roller 25 and the spring receiving portion 27, and urges the second roller 25 to the other side of the wedge-shaped space S in the circumferential direction.

Figure 4:
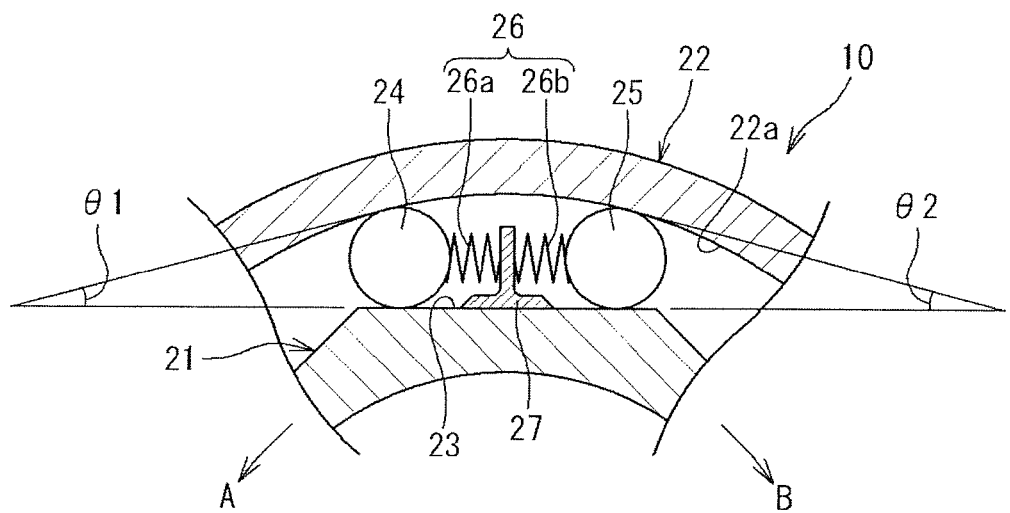
FIG. 4 is an enlarged sectional view of main portions of the torque limiter.

FIG. 4 is an enlarged sectional view illustrating main portions of the torque limiter 10. As illustrated in FIG. 4, the one side of each wedge-shaped space S in the circumferential direction is formed such that Expression (1) described below is satisfied in order to prevent engaging slippage of the first roller 24 (i.e., prevent the first roller 24 from failing to be engaged with the inner ring 21 and the outer ring 22) when the first torque is lower than a predetermined value.

$$\tan(\theta 1/2) < \mu \qquad \text{Expression (1)}$$

In Expression (1), $\theta 1$ is a first wedge angle and $\mu$ is a friction coefficient. The first wedge angle $\theta 1$ is an angle formed by a tangent to the first roller 24 at the point of contact between the first roller 24 and the cam face 23 and a tangent to the first roller 24 at the point of contact between the first roller 24 and the inner peripheral face 22a of the outer ring 22 in the state where the first roller 24 is in the wedge-engagement state. In the present embodiment, because the friction coefficient μ is 0.1 (μ=0.1), Expression (1) is satisfied when the first wedge angle θ1 is smaller than 10 degrees.

Furthermore, the one side of each wedge-shaped space S in the circumferential direction is formed such that if the first torque is higher than or equal to the predetermined value, Expression (2) described below is satisfied and therefore the first roller 24 further moves toward the one side in the circumferential direction and thus engaging slippage of the first roller 24 occurs (i.e., the first roller 24 is disengaged from the inner ring 21 and the outer ring 22).

$$\tan(\theta 1/2) \geq \mu \quad \text{Expression (2)}$$

In the present embodiment, because the friction coefficient μ=0.1, Expression (2) is satisfied when the first wedge angle θ1 is greater than or equal to 10 degrees.

The other side of each wedge-shaped space S in the circumferential direction is formed such that Expression (3) described below is satisfied in order to prevent engaging slippage of the second roller 25 when the second torque is lower than a predetermined value.

$$\tan(\theta 2/2) < \mu \quad \text{Expression (3)}$$

In Expression (3), θ2 is a second wedge angle and μ is a friction coefficient. The second wedge angle θ2 is an angle formed by a tangent to the second roller 25 at the point of contact between the second roller 25 and the cam face 23 and a tangent to the second roller 25 at the point of contact between the second roller 25 and the inner peripheral face 22a of the outer ring 22 in the state where the second roller 25 is in the wedge-engagement state. In the present embodiment, because the friction coefficient μ is 0.1 (μ=0.1), Expression (3) is satisfied when the second wedge angle θ2 is smaller than 10 degrees.

Furthermore, the other side of each wedge-shaped space S in the circumferential direction is formed such that if the second torque is higher than or equal to the predetermined value, Expression (4) described below is satisfied and therefore the second roller 25 further moves toward the other side in the circumferential direction and thus engaging slippage of the second roller 25 occurs.

$$\tan(\theta 2/2) \geq \mu \quad \text{Expression (4)}$$

In the present embodiment, because the friction coefficient μ=0.1, Expression (4) is satisfied when the second wedge angle θ2 is greater than or equal to 10 degrees.

Due to the foregoing configuration, when the motor 11 is driven to rotate the inner ring 21 in the direction of the arrow A such that the first torque is lower than the predetermined value, each first roller 24 moves toward the one side of the corresponding wedge-shaped space S, and thus the first roller 24 is brought into the wedge-engagement with the inner ring 21 and the outer ring 22. At this time, the engaging slippage of the first roller 24 is prevented, so that the first torque, which is the rotary torque of the inner ring 21, is transmitted to the outer ring 22 and therefore the inner ring 21 and the outer ring 22 rotate together with each other in the direction of the arrow A. As the inner ring 21 rotates in the direction of the arrow A, each second roller 25 moves to the one side of the corresponding wedge-shaped space S in the circumferential direction against the urging force of the second elastic member 26b. Therefore, the second roller 25 is not brought into the wedge-engagement with the inner ring 21 and the outer ring 22 on the other side of the wedge-shaped space S.

On the other hand, when the motor 11 is driven to rotate the inner ring 21 in the direction of the arrow B via the output shaft 12a of the speed reducer 12, each second roller 25 moves toward the other side of the corresponding wedge-shaped space S, and thus the second roller 25 is brought into the wedge-engagement with the inner ring 21 and the outer ring 22, so that the second torque, which is the rotary torque of the inner ring 21, is transmitted to the outer ring 22 and therefore the inner ring 21 and the outer ring 22 rotate together with each other in the direction of the arrow B. As the inner ring 21 rotates in the direction of the arrow B, each first roller 24 moves to the other side of the corresponding wedge-shaped space S in the circumferential direction against the urging force of the first elastic member 26a. Therefore, the first roller 24 is not brought into the wedge-engagement with the inner ring 21 and the outer ring 22 on the one side of the wedge-shaped space S.

If an abrupt change occurs in the wind speed or in the wind direction when the first rollers 24 or the second rollers 25 are in the wedge-engagement state, external force, such as the force of wind, may be applied to the outer ring 22 of the torque limiter 10 from the pinion gear 13 of each of the pitch drive devices 8 and the yaw drive devices 9 via the rotary body 14. In this case, if the first torque or the second torque becomes higher than or equal to the predetermined value, the wedge-engagement of the first rollers 24 or the second rollers 25 of the torque limiter 10 is cancelled.

Specifically, when the first torque becomes higher than or equal to the predetermined value when the first rollers 24 are in the wedge-engagement state, the first roller 24 further moves toward the one side of each wedge-shaped space S in the circumferential direction, whereby the first wedge angle θ1 is gradually increased. When the first wedge angle θ1 increases to such an angle that Expression (2) is satisfied, engaging slippage of each first roller 24 occurs between the inner ring 21 and the outer ring 22. Thus, the first roller 24 moves toward the other side in the circumferential direction against the urging force of the first elastic member 26a, and thus the wedge-engagement is cancelled. Therefore, it is possible to interrupt transmission of the first torque, which has become higher than or equal to the predetermined value, between the inner ring 21 and the outer ring 22.

Similarly, when the second torque becomes higher than or equal to the predetermined value when the second rollers 25 are in the wedge-engagement state, the second roller 25 further moves toward the other side of each wedge-shaped space S in the circumferential direction, whereby the second wedge angle θ2 is gradually increased. When the second wedge angle θ2 increases to such an angle that Expression (4) is satisfied, engaging slippage of each second roller 25 occurs between the inner ring 21 and the outer ring 22. Thus, the second roller 25 moves toward the one side in the circumferential direction against the urging force of the first elastic member 26b, and thus the wedge-engagement is cancelled. Therefore, it is possible to interrupt transmission of the second torque, which has become higher than or equal to the predetermined value, between the inner ring 21 and the outer ring 22.

Therefore, with the torque limiter 10 and the wind turbine 2 in the present embodiment, if the first or second torque that is higher than or equal to the predetermined value is applied, transmission of the torque is interrupted, regardless of whether the inner ring 21 and the outer ring 22 are rotating relative to each other in the one direction or in the other direction. As a result, it is possible to prevent the first or second torque that is higher than or equal to the predetermined value from acting on the motor 11 or the speed reducer 12 when an abrupt change occurs in the wind speed or in the wind direction. As a result, it is possible to prevent damages to the motor 11 and the speed reducer 12.

Figure 5:
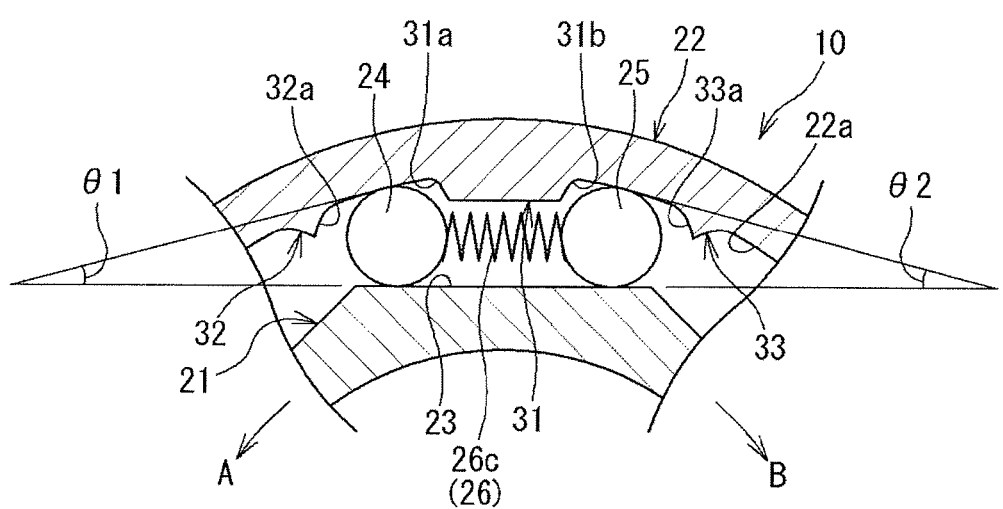
FIG. 5 is an enlarged sectional view illustrating main portions of a torque limiter according to another embodiment of the invention.

FIG. 5 is an enlarged sectional view of main portions of a torque limiter according to another embodiment of the invention. As illustrated in FIG. 5, in the torque limiter 10 in the present embodiment, each urging device 26 is formed of a single elastic member 26c that is, for example, a compression coil spring. Respective end portions of the elastic member 26c are in contact with the first roller 24 and the second roller 25. The elastic member 26c urges the first roller 24 toward the one side of the wedge-shaped space S in the circumferential direction, and urges the second roller 25 toward the other side of the wedge-shaped space S in the circumferential direction.

The torque limiter 10 in the present embodiment has restriction portions 31 each of which prevents the first roller 24 or the second roller 25 from moving excessively largely toward the opposite side in the circumferential direction when the wedge-engagement of the first roller 24 or the second roller 25 is cancelled. The restriction portion 31 is formed integrally with the inner peripheral face 22a of the outer ring 22 so as to protrude into the corresponding wedge-shaped space S. A first contact portion 31a that the first roller 24 contacts and a second contact portion 31b that the second roller 25 contacts are formed at respective end portions of the restriction portion 31 in the circumferential direction. Thus, when the wedge-engagement of the first roller 24 is cancelled, the first roller 24 contacts the first contact portion 31a, whereby the first roller 24 is restrained from moving toward the other side of the wedge-shaped space S in the circumferential direction. Similarly, when the wedge-engagement of the second roller 25 is cancelled, the second roller 25 contacts the second contact portion 31b, whereby the second roller 25 is restrained from moving toward the one side of the wedge-shaped space S in the circumferential direction. The restriction portion 31 is formed so as to extend in the longitudinal direction of the elastic member 26c, and therefore serves to guide the elastic member 26c.

In the torque limiter 10 in the present embodiment, a ridge-shaped first protruded portion 32 and a ridge-shaped second protruded portion 33 are formed integrally with the inner peripheral face 22a of the outer ring 22, which faces each cam face 23, so as to be protruded into each wedge-shaped space S. The first protruded portion 32 is protruded at the one side of the wedge-shaped space S in the circumferential direction, and has a first arc face 32a of which the curvature is greater than the curvature of the inner peripheral face 22a of the outer ring 22 (i.e., of which the curvature radius is smaller than the curvature radius of the inner peripheral face 22a of the outer ring 22). The second protruded portion 33 is protruded at the other side of the wedge-shaped space S in the circumferential direction, and has a second arc face 33a of which the curvature is greater than the curvature of the inner peripheral face 22a of the outer ring 22 (i.e., of which the curvature radius is smaller than the curvature radius of the inner peripheral face 22a of the outer ring 22). In the present embodiment, the first arc face 32a and the second arc face 33a have the same curvature, that is, have the same curvature radius. Note that, other configurations of the present embodiment are the same as those of the embodiment illustrated in FIG. 4, and therefore the description thereof will be omitted.

With the thus configured torque limiter 10 according to the present embodiment, because the first and second arc faces 32a, 33a of the first and second protruded portions 32, 33 each have a greater curvature (smaller curvature radius) than that of the inner peripheral face 22a of the outer ring 22, the first or second wedge angle θ1, θ2 abruptly increases when the first or second roller 24, 25 reaches the first or second arc face 32a, 33a after moving along the inner peripheral face 22a of the outer ring 22. As a result, it is possible to improve the response of cancellation of the wedge-engagement of the first or second roller 24, 25 (i.e., it is possible to more quickly cancel the wedge-engagement of the first or second roller 24, 25) when the first or second torque becomes higher than or equal to the predetermined value.

Furthermore, when the wedge-engagement of the first or second roller 24, 25 is cancelled, the restriction portion 31 prevents the first or second roller 24, 25 from moving excessively largely toward the opposite side of the wedge-shaped space S in the circumferential direction against the urging force of the elastic member 26c. As a result, it is possible to suppress occurrence of damages to the elastic member 26c due to the excessively large movement of the first or second roller 24, 25.

Note that, the invention is not limited to the foregoing embodiments, and may be implemented in various modified embodiments. For example, in the foregoing embodiments, each cam face 23 is formed on the outer peripheral face 21a of the inner ring 21. Alternatively, each cam face 23 may be formed on the inner peripheral face 22a of the outer ring 22. In the embodiment illustrated in FIG. 4, the spring receiving portions 27 are provided. However, the spring receiving portions 27 may be omitted. In this case, each urging device 26 may be formed of a single elastic member. In the embodiment illustrated in FIG. 5, each restriction portion 31 is formed of a single restriction portion. Alternatively, the restriction portion may be formed of two restriction portions that the first roller 24 and the second roller 25 respectively contact.

According to the invention, it is possible to interrupt transmission of excessively high torque regardless of whether the excessively high torque is applied in the forward rotation direction or in the reverse rotation direction.

What is claimed is:

1. A torque limiter, comprising:
   an inner ring;
   an outer ring;
   cam faces that are formed on one of an outer peripheral face of the inner ring and an inner peripheral face of the outer ring, and that define, in cooperation with the other one of the outer peripheral face of the inner ring and the inner peripheral face of the outer ring, a plurality of wedge-shaped spaces arranged in a circumferential direction, in each of which a clearance in a radial direction between the inner ring and the outer ring gradually becomes smaller toward each of both sides of the wedge-shaped space in the circumferential direction;
   first rollers each of which is arranged in a corresponding one of the wedge-shaped spaces and transmits a first torque between the inner ring and the outer ring by being brought into wedge-engagement with the inner ring and the outer ring, at one side in the wedge-shaped space in the circumferential direction when the inner ring and the outer ring rotate relative to each other in one direction;

second rollers each of which is arranged in a corresponding one of the wedge-shaped spaces and transmits a second torque between the inner ring and the outer ring by being brought into wedge-engagement with the inner ring and the outer ring, at the other side in the wedge-shaped space in the circumferential direction when the inner ring and the outer ring rotate relative to each other in the other direction that is a direction opposite to the one direction; and urging devices each of which is arranged between a corresponding one of the first rollers and a corresponding one of the second rollers, and urges the first roller and the second roller in such directions that the first roller and the second roller are brought into the wedge-engagement, wherein each of the wedge-shaped spaces is formed such that when the first torque becomes higher than or equal to a predetermined value, a first wedge angle of the first roller becomes such an angle that the wedge-engagement of the first roller is cancelled, and when the second torque becomes higher than or equal to the predetermined value, a second wedge angle of the second roller becomes such an angle that the wedge-engagement of the second roller is cancelled, at the one side in the circumferential direction, of a portion of one of the outer peripheral face of the inner ring and the inner peripheral face of the outer ring, the portion facing a corresponding one of the cam faces, there is formed a first protruded portion that is protruded into a corresponding one of the wedge-shaped spaces and that has a first arc face having a curvature greater than a curvature of the one of the outer peripheral face of the inner ring and the inner peripheral face of the outer ring, and at the other side in the circumferential direction, of a portion of the one of the outer peripheral face of the inner ring and the inner peripheral face of the outer ring, the portion facing a corresponding one of the cam faces, there is formed a second protruded portion that is protruded into a corresponding one of the wedge-shaped spaces and that has a second arc face having a curvature greater than the curvature of the one of the outer peripheral face of the inner ring and the inner peripheral face of the outer ring.

2. The torque limiter according to claim 1, further comprising restriction portions each of which is formed on one of the outer peripheral face of the inner ring and the inner peripheral face of the outer ring, restrains a corresponding one of the first rollers from moving toward the other side in the circumferential direction when the wedge-engagement of the first roller is cancelled, and restrains a corresponding one of the second rollers from moving toward the one side in the circumferential direction when the wedge-engagement of the second roller is cancelled.

3. A wind turbine, comprising:
a motor that is able to rotate in a forward rotation direction and a reverse rotation direction, and a speed reducer, the motor and the speed reducer constituting a pitch drive device used to adjust a pitch angle of a blade that is rotated upon reception of force of wind or a yaw drive device that turns a nacelle that supports the blade, relative to a tower; and
the torque limiter according to claim 1, which interrupts torque transmission to the motor or to the speed reducer when a torque that is higher than or equal to a predetermined value is applied due to external force.

4. A wind turbine, comprising:
a motor that is able to rotate in a forward rotation direction and a reverse rotation direction, and a speed reducer, the motor and the speed reducer constituting a pitch drive device used to adjust a pitch angle of a blade that is rotated upon reception of force of wind or a yaw drive device that turns a nacelle that supports the blade, relative to a tower; and
the torque limiter according to claim 2, which interrupts torque transmission to the motor or to the speed reducer when a torque that is higher than or equal to a predetermined value is applied due to external force.

5. A wind turbine generator, comprising:
the wind turbine according to claim 3; and
a generator that generates electricity as the blade of the wind turbine is rotated upon reception of force of wind.

6. A wind turbine generator, comprising:
the wind turbine according to claim 4; and
a generator that generates electricity as the blade of the wind turbine is rotated upon reception of force of wind.

* * * * *